United States Patent [19]

Studtmann et al.

[11] Patent Number: 5,216,352
[45] Date of Patent: Jun. 1, 1993

[54] SOLID STATE CURRENT CONTROLLED INTERRUPTION SYSTEM

[75] Inventors: George H. Studtmann, Mount Prospect; Donald H. Ward, Glen Ellyn, both of Ill.

[73] Assignee: Square D Company, Palatine, Ill.

[21] Appl. No.: 619,844

[22] Filed: Nov. 29, 1990

[51] Int. Cl.⁵ .................................. G05F 1/455
[52] U.S. Cl. ........................ 323/241; 323/235; 323/239; 323/319; 323/322; 323/901; 323/908; 361/96; 361/101
[58] Field of Search ............... 323/235, 238, 239, 241, 323/242, 243, 319, 320, 321, 322, 323, 324, 901, 908; 361/94, 95, 96, 97, 98, 100, 101

[56] References Cited

U.S. PATENT DOCUMENTS

| | | | |
|---|---|---|---|
| 3,859,591 | 1/1975 | Saunders | 323/239 |
| 4,047,235 | 9/1977 | Davis | 361/100 |
| 4,245,184 | 1/1981 | Billings et al. | 323/235 |
| 4,392,103 | 7/1983 | O'Sullivan et al. | 323/285 |
| 4,396,882 | 8/1983 | Kellenbenz | 323/908 |
| 4,680,490 | 7/1987 | Baker et al. | 323/235 |
| 4,731,691 | 3/1988 | Padwa | 361/87 |

Primary Examiner—Emanuel T. Voeltz
Attorney, Agent, or Firm—Larry I. Golden; Kareem M. Irfan

[57] ABSTRACT

A solid state circuit interruption arrangement monitors a current path to provide protection to both a load and a solid state switch. The arrangement includes an energy absorber for absorbing energy from the current path in response to the solid state switch interrupting the current path, and a control circuit for periodically generating the interrupt signal to interrupt the current path for prescribed intervals and to control the current supplied to the load between a maximum current level and a minimum current level.

27 Claims, 5 Drawing Sheets

SOLID STATE CURRENT CONTROLLED INTERRUPTION SYSTEM

FIELD OF THE INVENTION

The present invention relates generally to circuit breakers, and, more particularly, to solid state circuit interruption systems.

BACKGROUND OF THE INVENTION

A conventional solid state interrupter, as exemplified in FIG. 1, includes a suitable solid state switch 10 which interrupts a current path between a source 11 and a load 12, under the control of make and break signals (at leads 13) applied to an electronic logic controller 14. The make and break signals may be applied manually or from an external control source. A current sensor 16 supplies one or more signals to the electronic controller 14 which processes the information and causes the switch 10 to open, should an overload or short circuit condition be detected. A transient voltage suppressor 18 is connected across the switch to absorb incoming line transients or energy stored in the load and/or line inductances (represented by coil 15) when the switch is opened.

In a conventional solid state interruption system, when the switch interrupts a short circuit current, the current in the current path rises rapidly and causes the current to transfer to the transient absorber which absorbs the energy stored in the line and/or load. For example, using the structure of FIG. 1 having a 22,000 AIC, 240 volt, 3-phase line, the current will attain a level of 280 amps in about 23 microseconds. At this point, the switch must open and interrupt the current. The current then transfers to the transient absorber which absorbs the energy stored in the line and/or load. The switch must be very fast acting or else the current will rise to a very high level and the switch will fail. Unfortunately, because of its necessary fast response time, the switch is highly susceptible to nuisance tripping in the presence of noise and other types of adverse line conditions.

The large overload requirements that a circuit breaker must tolerate are also a significant problem for a solid state interrupter. While most conventional circuit breakers tolerate long-term overloads such as motors without tripping, solid state devices have minimal thermal mass and, therefore, cannot handle large overloads such as those presented with motors. One popular conventional circuit breaker, for example, can tolerate an overload of 35 times its rated level for 0.15 seconds. If overloads of this magnitude had to be carried by a solid state switch, the switch would have to be significantly over-designed.

Another problem associated with known solid state circuit breakers concerns the amount of overload current "let-through" the breaker. This "let-through" current is primarily due to the design of the solid state switch, rather than to the current demands of the load. It is, therefore, important to design the solid state interruption systems to handle anticipated worst case load conditions rather than just duplicate the steady-state performance specification of the breaker.

Different overloads that may be anticipated by solid state interruption systems may be subdivided into one of two types. The first type is a long-term overload, which is imposed by equipment such as motors. The second type, a short-term overload, is defined by a rapidly rising overload imposed by devices such as transformers, capacitors, incandescent bulbs, etc., when they are initially energized. While the former type of overload must be carried in order for a motor to start, the short-term rapidly rising overloads are undesirable transients because they are detrimental to the load itself.

Moreover, it is virtually impossible to distinguish between a rapidly rising current overload caused by a true short circuit and that caused by the inrush of current due to, say, connecting an uncharged capacitor across the line. If the switch is to interrupt the current in say 23 microseconds, at 280 amps, it may be breaking a short circuit appropriately, or it may be stopping a capacitor from being fully charged erroneously. In any case, prior art switches are designed to stop the current at the 280 amp level, because they cannot distinguish between the two overload types.

Accordingly, there is need for a solid state breaker arrangement and technique that overcomes the above deficiencies known to the prior art.

OBJECTS AND SUMMARY OF THE INVENTION

An important object of the present invention is to provide a solid state interruption arrangement which regulates the current supplied to the load so as to limit stresses on the load, the absorber and the solid state switch.

In accordance with a preferred embodiment, the present invention provides a solid state interruption arrangement for interrupting current in a current path between a source and a load, in which a solid state switch is arranged to interrupt the current path in response to an interrupt signal generated by a control circuit. A sensing circuit is arranged to sense current in the current path. The control circuit periodically generates the interrupt signal, in response to the sensing circuit, to interrupt the current path for prescribed intervals such that the current received by the load is controlled between prescribed maximum and minimum current levels.

BRIEF DESCRIPTION OF THE DRAWINGS

Other objects and advantages of the invention will become apparent upon reading the following detailed description and upon reference to the drawings in which.

Figure 1:
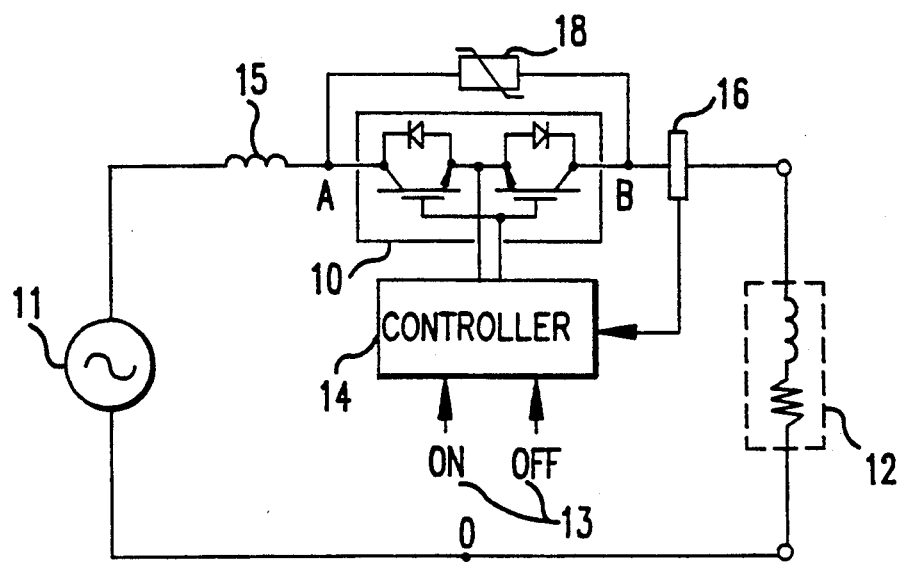
FIG. 1 is a block diagram of a conventional solid stat circuit.

While the invention is susceptible to various modifications and alternative forms, exemplary embodiments thereof has been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 3:
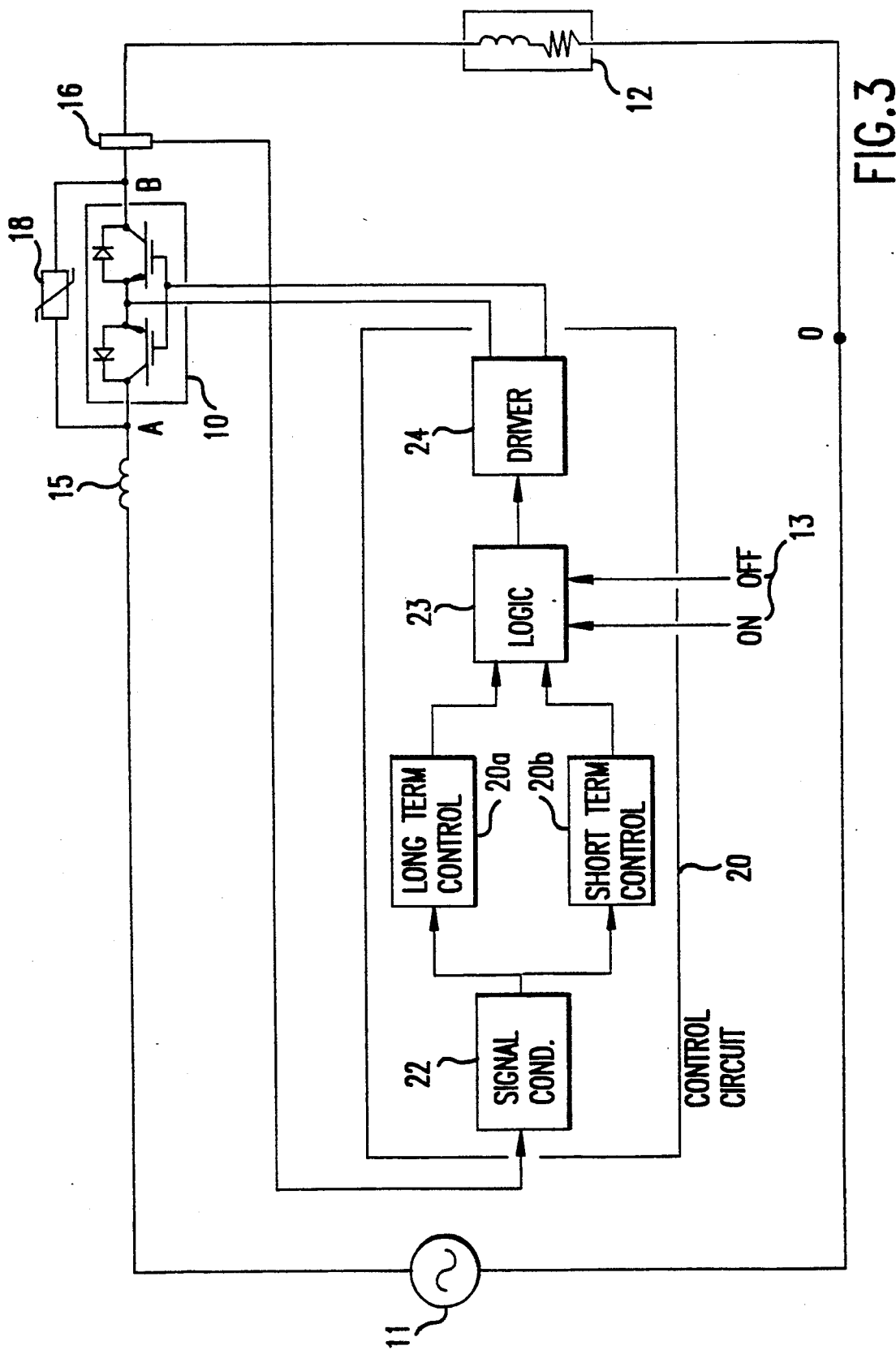
FIG. 3 is a block diagram of a solid state current controlled interruption circuit, according to the present invention.

In accordance with the present invention, FIG. 3 illustrates a solid state interrupter, in block diagram form, having a suitable solid state switch 10 which is arranged to interrupt a current path (DC or AC) between a source 11 and a load 12. As in FIG. 1, line inductance in the current path is illustrated by a discrete coil 15, a current sensor (or current transformer) 16 induces current from the current path, and a transient voltage suppressor ("absorber") 18, such as a metal oxide varistor, is connected across the switch 10 to absorb incoming line transients or energy stored in the load and/or line inductances when the switch is opened.

An important part of the structure illustrated in FIG. 3 includes a novel control circuit 20, which responds to the sensing circuit 16 by providing accurate and reliable energy control to the switch 10 and the load 12. The control circuit 20 responds to the sensing circuit 16 by periodically instructing the switch 10 to interrupt the current path for prescribed intervals such that the current supplied to the load is controlled between prescribed maximum and minimum current levels.

This operation is accomplished using two branches within the control circuit 20. The two branches differ in that the first branch includes a long-term control circuit 20a which operates to control the switch 10 for long-term type overloads, while the second branch includes a short-term control circuit 20b for operating the switch once overloads have exceeded a predetermined value. Both the long-term control circuit 20a and the short-term control circuit 20b receive their input signal via a signal conditioner 22, and provide respective output signals to a logic circuit 23 and a driver circuit 24. the latter of which controls the switch 10.

More specifically, if the sensed current is less than some predetermined value, e.g., 8 times the rated current, the long-term control circuit 20a controls the solid state switch 10 such that the current path is closed for a time which is dependent on the extent of the overload. For example, following conventional circuit breaker characteristics, the long-term control circuit 20a would turn off the switch 10 to interrupt the current path after 60 seconds of a sensed overload which is twice the rated current, after 10 seconds of a sensed overload which is four times the rated current, and after 3 seconds of a sensed overload which is eight times the rated current, etc. These numbers, of course, will vary with the particular breaker design.

If the sensed current exceeds the predetermined value, then the logic circuit 23 uses the output generated by the short-term control circuit 20b to control the driver 24 and switch 10. The short-term control circuit 20b responds to the sensor 16 by instructing the switch 10 to open and close periodically so that the current supplied to the load is controlled between prescribed maximum and minimum current levels. In this way, the switch is not experiencing stresses by current levels above the maximum current level. Similarly, current reaching the load 12 is also limited to the maximum current level.

The solid state switch 10 of FIG. 3 should be selected to handle overloads from the rated load out to an overload of X times the rated load for Y seconds (e.g., 8 times for 3 seconds), pursuant to a conventional circuit breaker current-time curve. The long-term control circuit 20a may be implemented in one of several conventional ways. For example, the conditioned current signal provided by the signal conditioner may be squared and then applied to a lag circuit having a suitable time constant. The output of the lag circuit may then be compared to a reference such that if the reference is exceeded, the switch is opened at the zero crossing of the current of the next half cycle. By proper choice of the time constant and reference level, the desired time-current characteristic may be obtained.

The long-term control circuit 20a may also be implemented using a microcomputer, which integrates the square of the current passing through the switch 10 with respect to time for each half cycle as a measure of the overload. In this embodiment, a running average of the integrated values is computed by the microcomputer wherein when the most recent value is added, the earliest value is removed from the computation. The average is computed over enough half cycles to give the required time-current characteristic. If the computed average of $I^2$ finally exceeds the predetermined maximum, then the switch is opened at the zero crossing of the current of the next half cycle.

Alternatively, other algorithms (other than integrating the square of the current) may be used to implement simpler but probably less advantageous systems. For example, the long-term branch of the control circuit 20 may integrate the current rather than the square of the current or monitor the peak current and turn off the breaker if a succession of peaks lasts longer than an allotted time.

By interrupting overloads in the current path at the zero crossing of the current, the energy stored in the line and the load is negligible, and the burden of dissipating large amounts of load energy is eliminated. When starting a motor load, for example, at the time of interruption, the inductive energy trapped in the load is quite significant and far exceeds the line inductance energy.

Figure 4A:
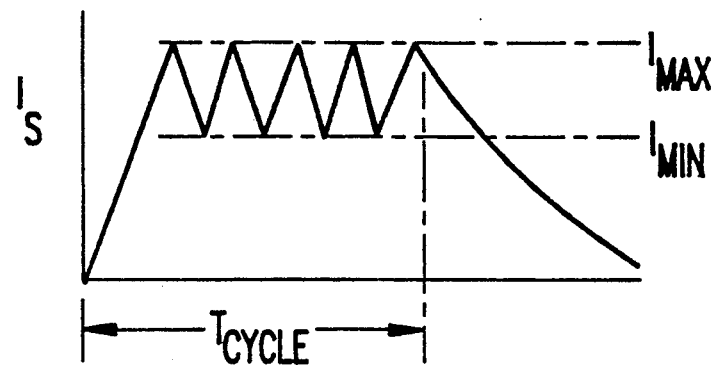
FIG. 4a is a timing diagram, in accordance with the present invention, which illustrates the manner in which the present invention is capable of handling line faults such as short circuits and rapid transient overloads.

In FIG. 4a, a current-time curve illustrates the manner in which short circuit and high rapid transient overloads are handled by the short-term control circuit 20b. When a short circuit is applied across the load 12 of FIG. 3, the rapid rise of the current is limited only by the line impedance and the impedance of the short. When a preset maximum current ("Imax") is reached, the switch 10 is turned off by the short-term control circuit 20b, and the current decays until it reaches a lower limit ("Imin"), at which time the switch is turned on again. The current is, therefore, caused to cycle between these two preset limits, Imax and Imin, as long as the short is present.

Similarly, if an uncharged capacitor is suddenly connected to the load, the current will rise rapidly and, if it reaches Imax, the switch 10 will turn off to allow the current to decrease. Once the switch 10 turns on again, the current will again increase until it reaches Imax.

This cycling process continues until the capacitor is charged to the line voltage, at which point the current stabilizes below Imax and the switch remains on.

As is well known in the art, a high inrush current may occur when magnetic components are first energized. For example, in the event that a transformer or inductor with a magnetic core is initially energized by the switch 10, a high inrush may be encountered depending upon the time in the cycle and the level of saturation of the core. Again, the current will be caused to cycle until the electromagnetics become unsaturated and the current settles to a reasonable value.

In the event of a spurious noise pulse or current transient, the switch may be turned off, and it will cycle between the current limits until the transient or until noise is no longer present. Depending upon the length of time the noise is present, the load will not be noticeably disturbed.

In order to differentiate between true short circuits and momentary overloads such as caused by capacitors or transformers being switched onto the line, a timer is used. The timer is initiated at the beginning of the current limiting cycle (when the current first reaches "Imax"). The time period is such as to enable capacitors to charge and transformers to go out of saturation. If at the end of the time period the current has not decreased to a normal or acceptable value, then the transient is presumed to be due to a short circuit and the control circuit 20 turns off the switch 10 and latches it off.

This strategy of cycling the switch 10 is especially useful in protecting against arcing faults. Arcing faults tend to produce high level, fast rising currents on a repetitive basis which cause the switch to cycle. The timing operation accommodates this situation by instructing the switch to turn off and stay off once a predetermined length of time or number of cycles is detected with this condition present.

Figure 2:
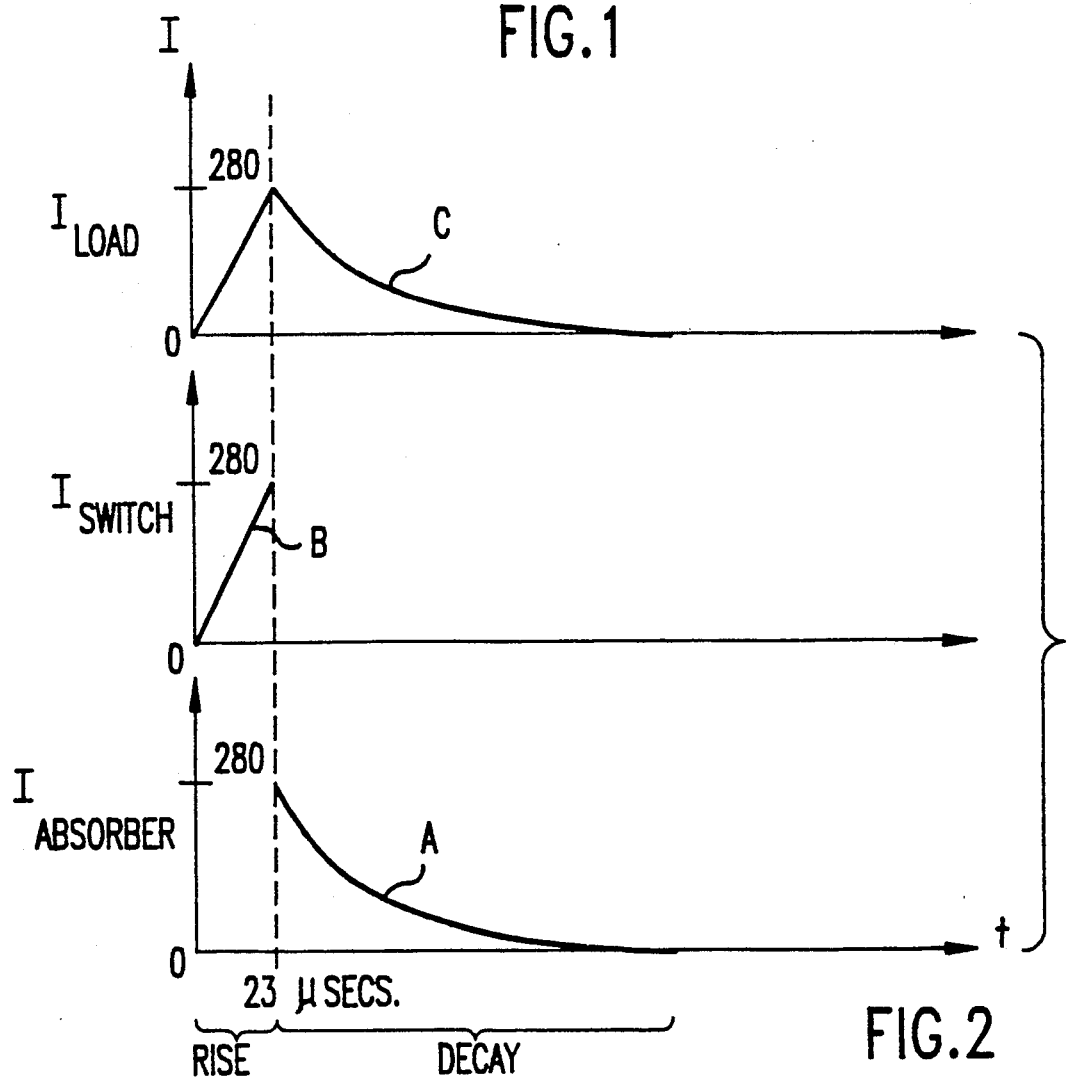
FIG. 2 comprises a series of timing diagrams which are representative of the operation of the conventional solid state interruption circuit of FIG. 1.

The repetitive cycling of the switch 10 will cause energy to dissipate into the inductive energy absorber(s) 18. This energy reaction may be recognized by referring to the waveforms of FIG. 2 in which the current at the switch 10 (waveform B) is shown being dissipated into the absorber 18 (waveform A). To reduce this energy dissipation, a strategy may be used in which the current level in subsequent cycles is limited to a lower value than Imax at which the switch would initially trip upon start-up. This reduces the average current level and results in less energy dissipation in the switch 10, absorber 18, and the load 12.

Figure 4B:
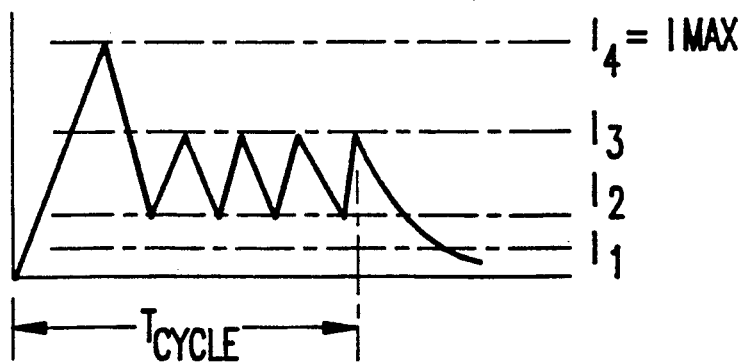
FIG. 4b is another timing diagram, also in accordance with the present invention, which illustrates an alternative manner in which the present invention can handle line faults.

A waveshape representing this type of operation is shown in FIG. 4b wherein the initial trip level is depicted as I4. The level I1 of FIG. 4b represents the rated current level. The level I4 of FIG. 4b corresponds to the Imax level of FIG. 4a, and I3 and I2 are lesser values between which the current will cycle once an initial peak of I4 is reached.

The current levels depicted in FIGS. 4a and 4b should be determined by considering the worst case loads on the switch. Also, the length of time that the switch may cycle ($T_{cycle}$ of FIG. 4a) should be determined by worse case design, in which the various loads and energy absorption capability of the inductive energy absorbers are considered.

The control circuit 20 of FIG. 3 may be implemented by programming a microcomputer, such as an MC68HC11-type integrated circuit available from Motorola, Inc., to determine when a zero-crossing occurs, calculate the square of the current, integrate $I^2$ over each half cycle, compute the running average, and compare the average to a reference. Further, using a microcomputer is advantageous in that modifications of the response time, set point, etc., may be easily made. Alternatively, however, the control circuit 20 may be implemented using discrete analog and digital components.

Figure 5:
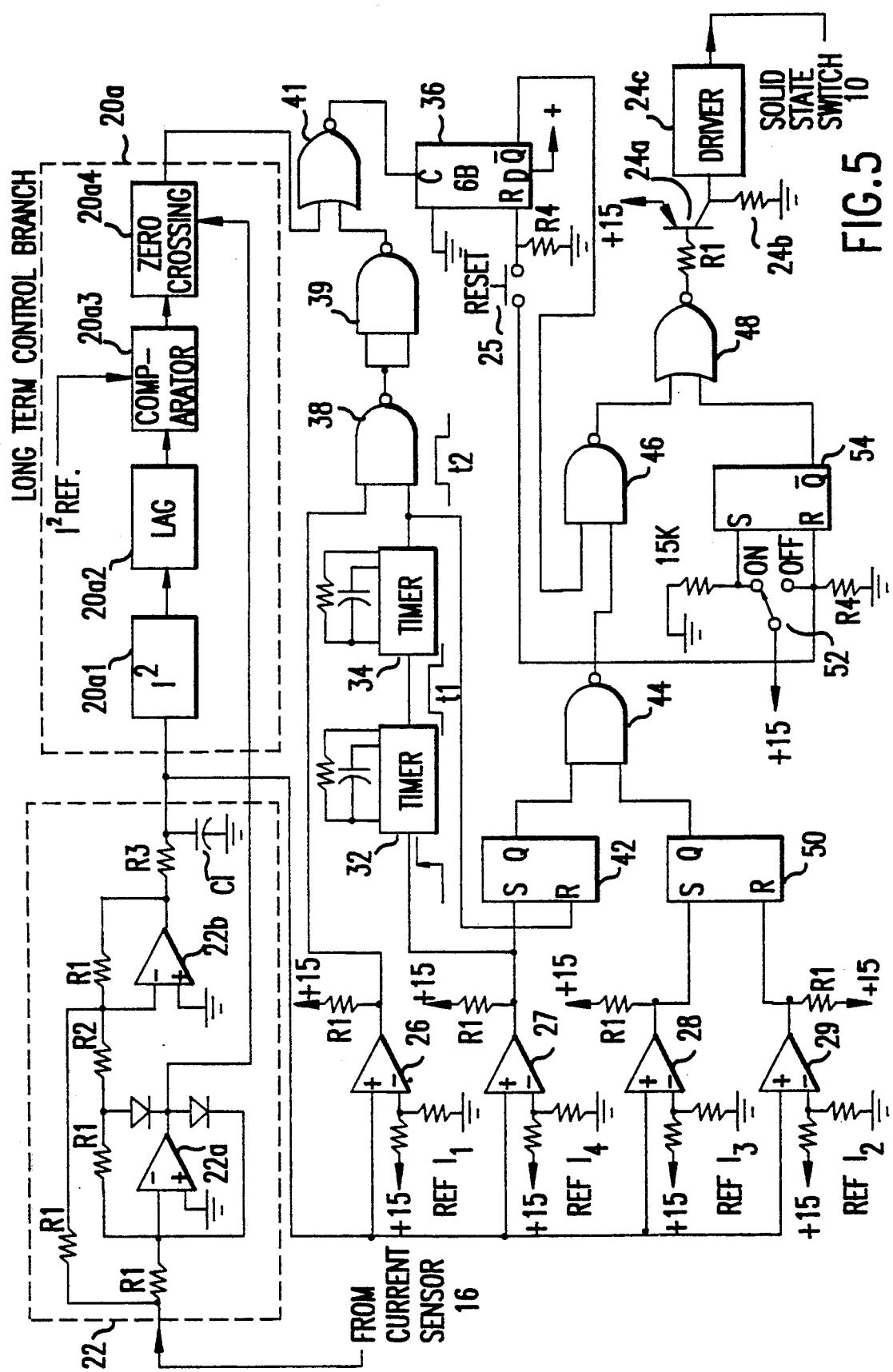
FIG. 5 is circuit diagram of a control circuit, according to the present invention, which may be used to implement the control circuit 20 of FIG. 3.

FIG. 5 illustrates a preferred embodiment using such discrete components, which are designated using common reference symbols for the same component values. The control circuit 20 of FIG. 5 receives an input signal at a signal conditioning circuit 22 from the current sensor 16 (FIG. 3) and provides a command signal through a transistor 24a, which may be implemented using a conventional 2N3906-type P-N-P transistor with a 620 Ohm bias resistor 24b, and a conventional driver circuit 24c suitable for the type of solid state switch 10 being used.

The signal conditioning circuit 22 includes a pair of conventionally arranged operational amplifiers 22a and 22b, with associated resistors R1, R2 and R3, and with resistor R3 and capacitor C1 providing filtering of very fast noise spikes that may be present on the input signal. The resistors R1, R2 and R3 may be implemented using respective 10 k, 4.99 k and 1 k Ohm values, the capacitor C1 using a 0.001 microfarad value, and the operational amplifiers 22a and 22b using a TL072CP (integrated circuit) available from Texas Instruments, Inc.

A preferred embodiment of the long-term control circuit 20a of FIG. 3 is shown in block form to include a squaring circuit 20a1 which takes the full wave rectified current signal from the signal conditioner 22 and provides an output proportional to the square of the sensed current. In the implementation shown, the $I^2$ signal is fed to a lag circuit 20a2 whose output, in turn, is passed to a comparator 20a3 for comparison with a reference voltage representing an $I^2$ value somewhat greater than the continuous rating of the circuit breaker. As is known to those skilled in the art, with suitable choice of lag circuit gain and time constant and comparator reference level, the desired time-current characteristic can be obtained. In applications concerning the interruption of AC current (versus a DC current application for which the present invention may also be used), the output of the comparator 20a3 is received by a zero-crossing detect circuit 20a4 which produces a high signal when: (1) the output of the lag circuit 20a2 exceeds the $I^2$ reference voltage, and (2) the output of the operational amplifier 22a indicates the presence of a zero crossing in the AC signal. An OR gate 41 is used to allow either the long- or short-term control circuits 20a and 20b to shut off the switch 10.

The remaining portion of the control circuit 20 is responsive to four comparators 26–29, which may be implemented using an LM339N type IC. Each comparator coxpares the conditioned input signal to an associated reference voltage, which is established using a conventional voltage divider circuit REF I1, REF I4, REF I3, or REF I2. Reference I4 corresponds to the Imax level of FIG. 4a and 4b, which is the current level at which the short-term control circuit 20b is activated. This is normally a value of from 8 to 10 times the circuit breaker continuous current rating. If this current is reached, the output of the comparator 27 goes high and sets the S-R flip-flop 42. Flip-flop 50 is also set by comparator 28, since reference I3 is at a lower level than reference I4. With both flip-flops 42 and 50 set, the output of NAND gate 44 is low resulting in a high input to OR gate 48, via NAND gate 46, which turns off transistor 24 and the solid state switch 10.

When the solid state switch 10 is turned off, the current begins to decay toward zero. When the current reaches a value corresponding to REF I2, comparator 29 changes state, resetting flip-flop 50. This then provides a logic low at the output of NAND gate 44, which results in a low at the other input to OR gate 48, turning on transistor 24 and, thereby, the solid state switch 10.

The current will again increase, and when it reaches a value corresponding to REF I3, flip-flop 50 is again set. This time, since flip-flop 42 is already set, the output of NAND gate 44 will go to logic low, turning off transistor 24 and the solid state switch 10. Thus, the current will cycle between values I2 and I3 as shown in FIG. 4b.

In order to limit the length of time during which such current chopping action can occur and to distinguish between true short circuits and momentary high current transients, a timer 32 is provided. The timer 32, which may be implemented using a CD4047BE type IC, is initiated when comparator 27 first changes state due to the current exceeding REF I4. The output of timer 32 goes high at that instant and remains high for a period $t_1$. At the end of the period $t_1$, timer 34, which may also be implemented using a CD4047BE type IC, is initiated. The timer 34 provides a high to NAND gate 38 for an interval $t_2$. The pulse output of timer 32 is on the order of ½ millisecond to several seconds (depending on the type of loads and the current capacity of the switch), and the pulse output of timer 34 is at least as long as a half cycle of the power line frequency.

If the current is greater than REF I1 at any time during the period $t_2$, then the output of NAND gate 38 will be low and the output of NAND gate 39 will be high. This clocks the type D flip-flop 36 causing transistor 24 to be turned off and, thus, turning off the solid state switch 10. If the current is greater than $I_1$ at any time in a half cycle interval after $t_1$, the solid state switch is, therefore, turned off and remains off until manually reset. To manually reset the circuit of FIG. 5, an ON-OFF switch 52 is first turned off after which the momentary RESET switch 25 may be operated to reset flip-flop 36. On the other hand, if the current has dropped to a normal value, less than $I_1$, before the end of $t_1$, then the solid state switch 10 remains on.

The leading edge of pulse $t_2$ is also used to reset flip-flop 42 so that the circuit is again ready to monitor short-term current overloads.

While a number of conventional remote control implementations may be used, the solid state switch 10 is preferably manually opened or closed by means of the switch 52 which resets or sets flip-flop 54.

The flip-flop 54, like flip-flops 42 and 50, may be implemented using a CD4013BE IC. The NAND and NOR gates may be implemented using CD4011BE and CD4071BE type ICs, respectively. The resistors depicted as R4 are preferably implemented using 15 kOhm values.

Figure 6:
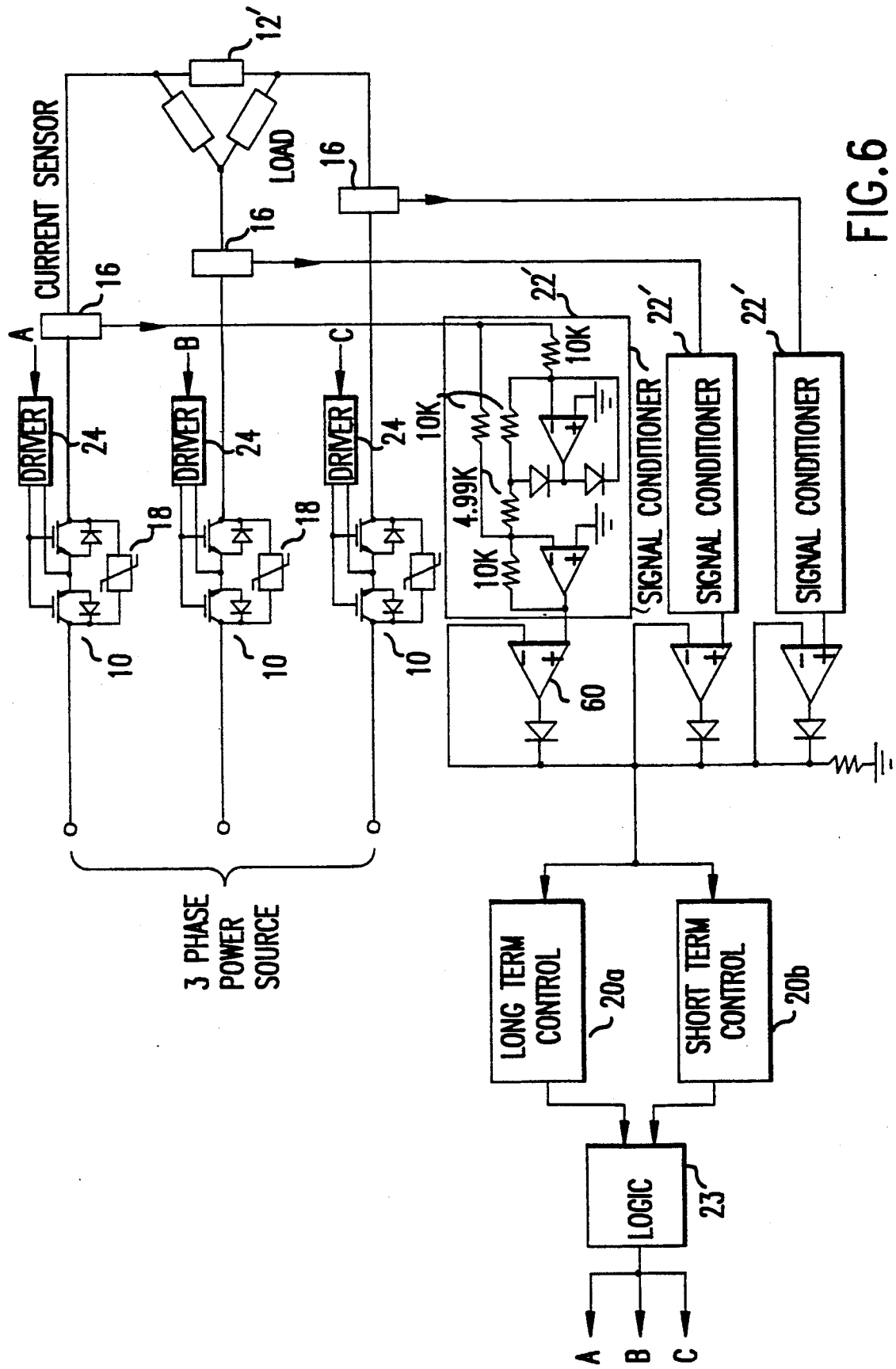
FIG. 6 is a block diagram of a control circuit, according to the present invention, illustrated for application in a three-phase system of power distribution.

FIG. 6 illustrates the solid state interruption system, according to the present invention, as applied to a three-phase power distribution system. In this arrangement, a solid state switch 10 is connected in each of three lines between the power source and the load 12'. A current sensor 16 in each line monitors the load current. A signal conditioner 22' is used with each current sensor 16 to obtain full wave rectified signals corresponding to the current in each of the lines. In this embodiment, the signals from each of the signal conditioners 22' are combined using three operational amplifiers 60 such that the highest magnitude of signal from the three signal conditioners will always be applied to the control circuit, comprising long- and short-term control circuits 20a, 20b, logic circuit 23 and drivers 24. The remainder of the functions of the control circuit of FIG. 6 operate in the same way as described in connection with FIG. 5. If an overload condition is detected, the control circuit 20 turns off all three drivers so that all of the solid state switches are opened simultaneously.

The arrangement of FIG. 6, in which the control functions are common to all three phases, is preferred from an economic standpoint. However, each phase could have its own control system. It should be noted that, ultimately, if an overload or short circuit is detected in any one phase, all switches should be turned off.

The short-term control branch, 20b, of FIG. 3 may be implemented using an alternative strategy to that previously described and illustrated in FIG. 5. Instead, a ramping or soft-start function may be implemented using a microcomputer or analog and digital circuits that will cause the voltage to be applied in a gradual manner. For example, if the inrush current from an incandescent lamp load causes the predetermined fault level to be reached, the solid state switch will be turned off by the controller. Starting with the next half cycle, the voltage may be applied by gradually increasing the phase angle at which the switch is turned on over a plurality of cycles. This type of control is analogous to that provided by solid state reduced voltage controllers such as Square D's Class 8660 Alpha Pak. If after attempting to restart in this manner, the current again reaches the predetermined fault level, then a short circuit is indicated and the switch is opened and remains open until reset.

While the invention has been particularly shown and described with reference to various embodiments, it will be recognized by those skilled in the art that other modifications and changes may be made to the present invention. For example, it is intended that the scope of the present invention encompasses DC and AC single- or multi-phase lines. Further, any type of arrangement including a combination of solid state devices or a single solid state bilateral device capable of conducting current and blocking voltage in both directions may be used to implement the switch 10. For example, it may be implemented using various circuit arrangements such as two devices in inverse parallel, two devices in inverse series, or a single device connected on the output terminals of a full wave rectifier. In whatever configuration, the solid state switch is preferably capable of blocking voltage of either polarity and conducting current in both directions. Additionally, two absorbers may be used in lieu of one absorber to reduce the total energy dissipation; one absorber may be connected across points A-O and the second across points B-O (FIG. 3). Such changes do not depart from the spirit and scope of the claimed invention which is set forth in the following claims.

What is claimed is:

1. A solid state interruption arrangement for interrupting alternating current having half-cycles in a current path between a source and a load, the arrangement comprising:

a solid state switch disposed as an integral part of the current path and arranged to interrupt the current path in response to an interrupt signal;

a sensing circuit arranged so as to sense current in the current path; and a control circuit, responsive to the sensing circuit, for periodically generating the interrupt signal asynchronously with the half-cycles to interrupt the current path for prescribed intervals such that the current supplied to the load is controlled between a maximum current level and a minimum current level.

2. A solid state interruption arrangement according to claim 1, further including energy absorbing means, coupled to the current path, for absorbing energy from the current path in response to the solid state switch interrupting the current path, and wherein the sensing circuit provides an induced current signal and the control circuit includes means for integrating the square of the induced current signal.

3. A solid state interruption arrangement, according to claim 2, wherein the control circuit includes means for comparing the square of the integrated induced current signal to a reference threshold representing the square of the current for which the solid state switch is rated.

4. A solid state interruption arrangement, according to claim 2, wherein the control means includes a microcomputer which is programmed to compare the square of the integrated induced current signal to a reference threshold representing the square of the current for which the solid stated switch is rated.

5. A solid state interruption arrangement, according to claim 2, wherein the current in the current path is alternating, the control means includes zero crossing detection means for detecting a zero crossing in the current, and the control means generates the interrupt signal so that the solid state switch interrupts the current path at the zero crossing of the current path in order to minimize the energy absorbed by the energy absorbing means.

6. A solid state interruption arrangement, according to claim 2, wherein the control circuit includes means, responsive to the sensing circuit, for detecting an initial trip level corresponding to a worst case switch condition and for controlling the current supplied to the load such that a maximum current level of the current supplied to the load is less than the initial trip level to limit the energy absorbed by the energy absorbing means.

7. A solid state interruption arrangement, according to claim 1, wherein the current in the current path is alternating and the control circuit further includes means, responsive to the solid state switch interrupting the current path, for controlling the interrupt signal such that voltage is gradually supplied to the load over a plurality of cycles.

8. A solid state interruption arrangement, according to claim 1, wherein the control circuit instantaneously interrupts the current path in response to the sensed current exceeding a predetermined limit.

9. A solid state interruption arrangement, according to claim 1, wherein the control circuit includes means for preventing current path interruption in response to inrush currents from a relatively long-term overload.

10. A solid state interruption arrangement, according to claim 9, wherein the control circuit determines the extent of the overload and generates the interrupt signal to interrupt the current path in response to the overload being present for a predetermined period of time.

11. A solid state interruption arrangement, according to claim 1, wherein the control circuit includes a timer which is to provide a time limit during which the load is controlled between the maximum current level and the minimum current level.

12. A solid state interruption arrangement, according to claim 1, wherein the control circuit includes ramping means for allowing the control circuit to establish the current path over a plurality of cycles based on a phase angle of the sensed current in the current path.

13. A solid state interruption arrangement for interrupting alternating current having half-cycles in a current path between a source and a load, the arrangement comprising:

a solid state switch disposed as an integral part of the current path and arranged to interrupt the current path in response to an interrupt signal;

a sensing circuit arranged so as to sense current in the current path; and a control circuit, responsive to the sensing circuit, including:

long-term means for preventing current path interruption in response to inrush currents from a relatively long-term overload, and short-term means for periodically generating the interrupt signal to interrupt the current path for a plurality of prescribed intervals between successive half-cycles such that the current supplied to the lad is controlled between a maximum current level and a minimum current level.

14. A solid state interruption arrangement for interrupting alternating current in a current path between a source and a load, the arrangement comprising:

a solid state switch disposed as an integral part of the current path and arranged to interrupt the current path in response to an interrupt signal;

energy absorbing means, coupled to the current path, for absorbing energy from the current path in response to the solid state switch interrupting the current path;

a sensing circuit, coupled to the current path, for providing an induced current signal from the current in the current path; and a control circuit, responsive to the sensing circuit, for generating the interrupt signal, the control circuit including comparison means for comparing the square of the integrated induced current signal to a lower threshold and to an upper threshold, each said threshold corresponding to the square of the current for which the solid stated switch is rated, timing means, responsive to said means for comparing, for timing the period during which the square of the integrated induced current signal exceeds said lower threshold, and zero crossing detection means for detecting zero crossings in the current in the current path, and generation means, responsive to said zero crossing detection means, for periodically generating the interrupt signal at the zero crossing of the current in the current path to minimize absorption energy and to interrupt the current path for a plurality of prescribed intervals between successive zero crossings such that the current supplied to the load is controlled between the lower and upper thresholds.

15. A solid state circuit interruption arrangement, according to claim 14, wherein the control circuit further includes means, responsive to the sensing circuit, for detecting an initial trip level corresponding to worst case switch conditions and for controlling the current supplied to the load such that upper threshold is less than the initial trip level, thereby minimizing energy absorbed by the energy absorbing means.

16. A solid state circuit interruption arrangement, according to claim 14, wherein the control circuit includes a microcomputer which is programmed to implement the comparison means and the timing means.

17. A solid state circuit interruption arrangement, according to claim 16, wherein the control circuit includes a microcomputer which is programmed to implement the zero crossing detection means.

18. A solid state circuit interruption arrangement, according to claim 14, wherein the control circuit includes a microcomputer which is programmed to implement the zero crossing detection means.

19. A solid state circuit interruption arrangement, according to claim 14, wherein the control circuit includes a microcomputer which is programmed to implement the comparison means, the timing means, the zero crossing detection means and the generation means.

20. A solid state circuit interruption arrangement, according to claim 14, wherein the control circuit further includes means, responsive to the solid state switch interrupting the current path, for controlling the interrupt signal such that voltage is gradually supplied to the load over a plurality of cycles.

21. A solid state interruption arrangement, according to claim 14, wherein the sensing circuit is coupled to the current path on the load side of the solid state switch.

22. A method for interrupting alternating current having half-cycles in a current path between a source and a load for use in a circuit breaker interruption arrangement, wherein a solid state switch is integrally arranged as part of a current path so as to interrupt the current path in response to an interrupt signal, the process comprising the steps of:
absorbing energy from the current path in response to the solid state switch interrupting the current path;
sensing current in the current path; and
in response to the sensed current, periodically generating the interrupt signal to interrupt the current path for a plurality of prescribed intervals between half-cycles and controlling the current supplied to the load between a maximum current level and a minimum current level.

23. A method for interrupting alternating current, according to claim 22, further including the step of controlling the interrupt signal, in response to the solid state switch interrupting the current path, such that voltage is gradually supplied to the load over a plurality of cycles.

24. A method for interrupting alternating current, according to claim 22, further including the step of detecting an initial trip level corresponding to worst case switch conditions and controlling the current supplied to the load such that maximum current level is less than the initial trip level.

25. A method for interrupting alternating current, according to claim 22, further including the step of detecting zero crossings in the current in the current path and controlling the interrupt signal such that voltage is gradually supplied to the load over a plurality of cycles.

26. A method for interrupting alternating current, according to claim 22, further including the step of integrating the square of the sensed current and comparing the square of the integrated sensed current to a reference threshold representing the square of the current for which the solid state switch is rated.

27. A solid state interruption arrangement for interrupting current in a current path between a source and a load, the arrangement comprising:
a solid state non-rectifier-type switch disposed as an integral part of the current path and arranged to interrupt the current path in response to an interrupt signal;
a sensing circuit arranged so as to sense current in the current path; and
a control circuit, responsive to the sensing circuit, including:
long-term means for preventing current path interruption in response to inrush currents from a relatively long-term overload, and
short-term means for periodically generating the interrupt signal to interrupt the current path for prescribed intervals such that the current supplied to the load is controlled between a maximum current level and a minimum current level.

* * * * *